United States Patent
An et al.

(10) Patent No.: US 11,186,801 B2
(45) Date of Patent: *Nov. 30, 2021

(54) METHOD FOR MANUFACTURING OIL GEL CAPSULES AND METHOD FOR MANUFACTURING CONTACT PART FOR VEHICLE, INCLUDING OIL GEL CAPSULES

(71) Applicants: Hyundai Motor Company, Seoul (KR); Kia Motors Corporation, Seoul (KR); Sahmyook University Industry-Academic Cooperation Foundation, Seoul (KR)

(72) Inventors: Jeong-Uk An, Suwon-si (KR); Hong-Wook Lee, Seongnam-si (KR); In-Woong Lyo, Suwon-si (KR); Kyung-Ku Yeo, Gwangmyeong-si (KR); Do-Young Wang, Seoul (KR); Ju-Yeong An, Hwaseong-si (KR); Myoung-Hwan Park, Namyangju-si (KR); Yu-Ri Park, Seoul (KR)

(73) Assignees: Hyundai Motor Company, Seoul (KR); Kia Motors Corporation, Seoul (KR); Sahmyook University Industry-Academic Cooperation Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,403

(22) Filed: Sep. 29, 2020

(65) Prior Publication Data
US 2021/0179964 A1    Jun. 17, 2021

(30) Foreign Application Priority Data
Dec. 16, 2019 (KR) .......................... 10-2019-0168352

(51) Int. Cl.
*C10M 169/04* (2006.01)
*C10M 129/44* (2006.01)
(Continued)

(52) U.S. Cl.
CPC ...... *C10M 169/044* (2013.01); *C10M 129/44* (2013.01); *C10M 145/04* (2013.01);
(Continued)

(58) Field of Classification Search
None
See application file for complete search history.

(56) References Cited

U.S. PATENT DOCUMENTS 5,908,377 A * 6/1999 Fukuda ............... C11B 15/00
516/102
5,919,741 A * 7/1999 Jaynes ................ C10M 177/00
508/460

(Continued)

FOREIGN PATENT DOCUMENTS

JP    2000246005 A    9/2000
JP    2009203329 A    9/2009

(Continued)

OTHER PUBLICATIONS

Duffy, Nicola, et al., "Organogel-Based Emulsion Systems, Micro-Structural Features and Impact on In Vitro Digestion", Journal of the American Oil Chemists' Society, 86, pages, published May 29, 2009, 733-741.

(Continued)

*Primary Examiner* — Vishal V Vasisth
(74) *Attorney, Agent, or Firm* — Slater Matsil, LLP

(57) ABSTRACT

An oil gel capsule includes an oil gel including an oil and a gelator, and at least one surfactant bonded to the oil gel. A contact part for a vehicle includes an overlay layer formed on a surface of the contact part, the overlay layer comprising (Continued)

oil gel capsules, wherein the oil gel capsules including an oil gel including an oil and a gelator, and at least one surfactant bonded to the oil gel.

17 Claims, 19 Drawing Sheets
(11 of 19 Drawing Sheet(s) Filed in Color)

(51) Int. Cl.
     *C10M 145/04*     (2006.01)
     *F16C 33/10*      (2006.01)
     *F16C 33/12*      (2006.01)
     *C10N 50/00*      (2006.01)
     *C10N 40/02*      (2006.01)
     *C10N 50/10*      (2006.01)

(52) U.S. Cl.
     CPC ........ *F16C 33/1045* (2013.01); *F16C 33/124* (2013.01); *C10N 2040/02* (2013.01); *C10N 2050/10* (2013.01); *C10N 2050/12* (2020.05)

(56) References Cited

U.S. PATENT DOCUMENTS

| | | | |
|---|---|---|---|
| 9,982,715 B2 | 5/2018 | Gorges et al. | |
| 2003/0193102 A1 | 10/2003 | Yan | |
| 2012/0201962 A1* | 8/2012 | Kawata | C07C 271/22 427/346 |
| 2015/0323010 A1 | 11/2015 | Berens et al. | |
| 2016/0084308 A1 | 3/2016 | Gorges et al. | |
| 2019/0185782 A1 | 6/2019 | Webster et al. | |

FOREIGN PATENT DOCUMENTS

| | | |
|---|---|---|
| JP | 2011025242 A | 2/2011 |
| JP | 2013113371 A | 6/2013 |
| KR | 100454659 B1 | 10/2004 |
| KR | 20160119293 A | 10/2016 |

OTHER PUBLICATIONS

Kirilov, Plamen, et al., "A new type of colloidal dispersions based on nanoparticles of gelled oil", Colloids and Surfaces A: Physicochemical Engineering Aspects, vol. 328, Issues 1-3, Oct. 1, 2008, 7 pages.
Salazar-Bautista, Sebastian-Camilo, et al., "Encapsulation and release of hydrophobic molecules from particles of gelled triglyceride with aminoacid-based low-molecular weight gelators". Colloids and Surfaces A: Physicochemical and Engineering Aspects, vol. 514, Feb. 5, 2017, pp. 11-20.

* cited by examiner

METHOD FOR MANUFACTURING OIL GEL CAPSULES AND METHOD FOR MANUFACTURING CONTACT PART FOR VEHICLE, INCLUDING OIL GEL CAPSULES

CROSS-REFERENCE TO RELATED APPLICATIONS

This application claims priority under 35 U.S.C. § 119 to Korean Patent Application No. 10-2019-0168352, filed on Dec. 16, 2019, in the Korean Intellectual Property Office, the disclosure of which is incorporated herein by reference in its entirety.

TECHNICAL FIELD

The present invention relates to a method for manufacturing oil gel capsules and a method for manufacturing a contact part for a vehicle, including oil gel capsules.

BACKGROUND

A bearing is one of the machine elements that constrain relative motion to the desired motion, and reduce friction between moving parts. Since bearings are loaded with hard chains or balls, and thus susceptible to fatigue fracture, bearings based on alloy (hereinafter, bearing alloy) which have excellent wear resistance, corrosion resistance, and thermal conductivity and have a vibration absorbing function are usually used.

However, bearing alloys are also inevitably subject to wear and tear due to continuous friction, which may lead to a sharp decrease in seizure resistance characteristics. Accordingly, various coating materials for protecting the bearing alloy from wear and tear, that is, overlay materials, have been developed, and polyamideimide and a lubricant have been usually used as the overlay material.

When the overlay material is developed, it needs to be considered that the wear resistance of the bearing deteriorates remarkably in the early stage of vehicle operation, and the lifetime of a composite material (bearing alloy and overlay material) needs to be extended by preventing additional wear and tear in the early stage of vehicle operation, that is, the initial wear stage of the bearing. Therefore, there is a need for developing an overlay material which can maintain seizure resistance characteristics even after wear and tear occurs in the composite material.

U.S. Pat. No. 9,982,715 discloses a microcapsule as one of the overlay materials. The microcapsule contains a liquid lubricant in a hard plastic skin, and the liquid lubricant may be released to the outside only when the plastic skin is physically damaged. It can be said that the release of the liquid lubricant is independent of the temperature environment of the composite material. Further, since the damaged plastic skin may be aggregated, the damaged plastic skin may not only induce an engine defect but also reduce the engine efficiency.

Japanese patent document JP 2013-113371 discloses a lubricant composition which responds to a change in temperature. Korean patent document KR 10-0454659 relates to a method for infiltrating a lubricant composition including a lubricant and a gelator into pores inside a bearing which is a sintered material. However, the high viscosity of the lubricant composition and the limited size of the pores in the bearing have a limitation on the application thereof. Furthermore, since the lubricant composition was not disclosed as an overlay material of a bearing, there is a limitation in referencing the lubricant composition as a method of extending the lifetime of the composite material.

SUMMARY

The present invention relates to a method for manufacturing oil gel capsules and a method for manufacturing a contact part for a vehicle, including oil gel capsules. Particular embodiments relate to a material for an overlay layer formed on the surface of a contact part for a vehicle, such as a bearing alloy.

Embodiments of the present invention provide an overlay material which may respond to the temperature environment.

Embodiments of the present invention also provide an overlay material which does not cause an aggregation phenomenon even after an oil is released.

Embodiments of the present invention may provide a method for manufacturing an oil gel capsule. Embodiments of the present invention may include (a) manufacturing oil gels by mixing an oil and a gelator and (b) producing at least one oil gel capsule by mixing the oil gels and an aqueous surfactant solution.

Preferably, the oil gel capsules may be produced by surrounding the oil gels with a surfactant.

Preferably, the oil gels in Step (b) may be in a liquid state.

Preferably, the oil gel capsules may have a size of 0.1 µm or more and less than 10 µm.

Preferably, the oil gel capsules may have a size of 0.1 µm or more and 1 µm or less.

Preferably, the oil and the gelator may be mixed using an ultrasonic grinder.

Preferably, the oil gel and the aqueous surfactant solution may be mixed using an ultrasonic grinder.

Preferably, embodiments of the present invention may further include (c) drying the aqueous solution.

Preferably, the aqueous solution may be freeze-dried.

Preferably, after performing Step (c), the oil gel capsules may be collected as an oil powder in which at least two or more oil gel capsules are aggregated.

Embodiments of the present invention may provide a method for manufacturing a contact part for a vehicle, including an oil gel capsule. Embodiments of the present invention may include the above-described Steps (a) to (c), and may include (d) preparing a first organic solution including 2 to 10 wt % of the oil gel capsules by re-dispersing the oil powder in an organic solvent, (e) preparing an overlay mixed solution by mixing the first organic solution and a second organic solution including 30 to 50 wt % of polyamideimide and an additive at a weight ratio of 1:0.5 to 1:2, and (f) coating a surface of the contact part with the overlay mixed solution, and then drying the contact part.

Preferably, an overlay layer formed by Step (f) may have a thickness of 10 µm to 30 µm.

According to embodiments of the present invention, it is possible to provide an overlay material which can respond to the temperature environment and can improve friction resistance characteristics and seizure resistance characteristics.

According to embodiments of the present invention, even after an oil is released, an aggregation phenomenon of a gelator and an aggregation phenomenon of a surfactant may not occur.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5, which includes FIG. 5A is an oil gel to which a colorant is not added, and FIG. 5B is an oil gel to which a colorant is added. The colorant was added to more clearly exhibit the condition of the oil gels.

DETAILED DESCRIPTION OF ILLUSTRATIVE EMBODIMENTS

Hereinafter, embodiments of the present invention will be described in detail. However, the present invention is not limited or restricted by exemplary embodiments thereof. Objects and effects of the present invention will be naturally understood or become apparent from the following description, and the objects and effects of the present invention are not limited by only the following description. Further, in the description of embodiments of the present invention, when it is determined that the detailed description for the publicly-known technology related to the present invention can unnecessarily obscure the gist of the present invention, the detailed description thereof will be omitted.

Figure 1:
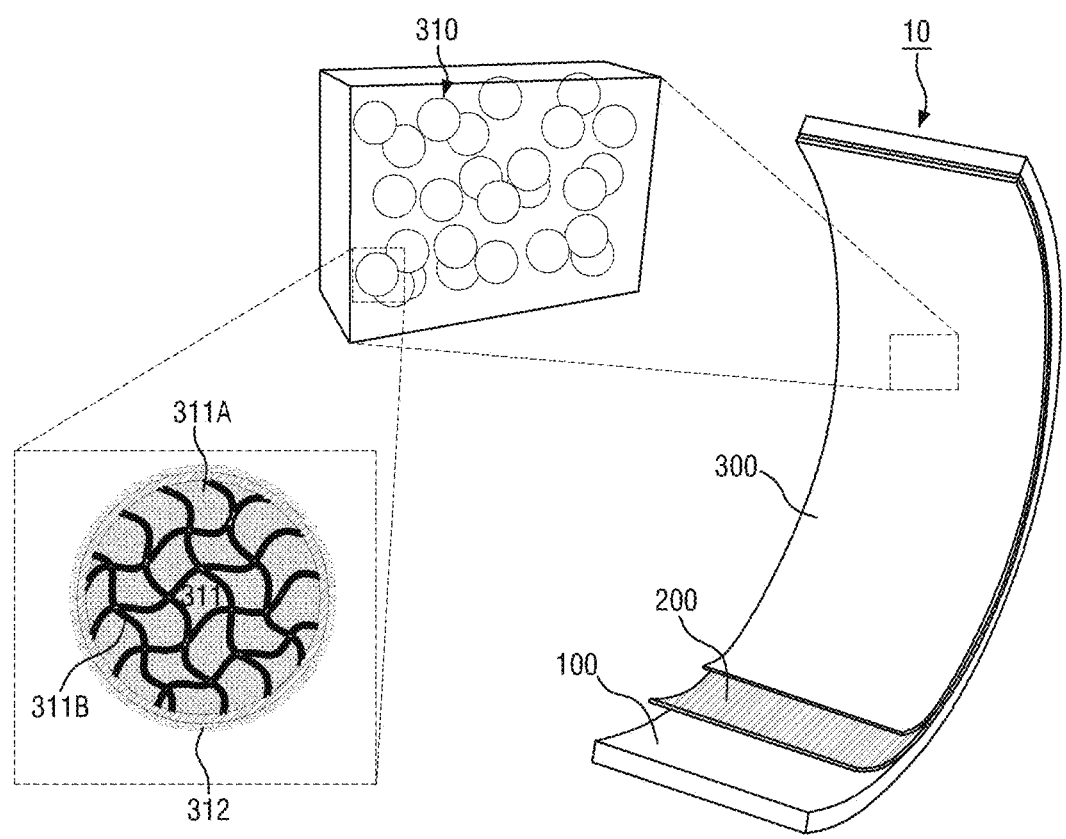
FIG. 1 illustrates a bearing including oil gel capsules, in accordance with embodiments of the present invention.
Figure 2A:
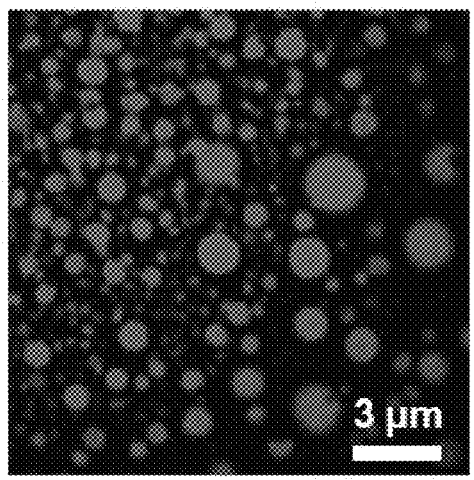
FIGS. 2A to 2C are confocal fluorescence images of oil gel capsule(s) included in a bearing.
Figure 2B:
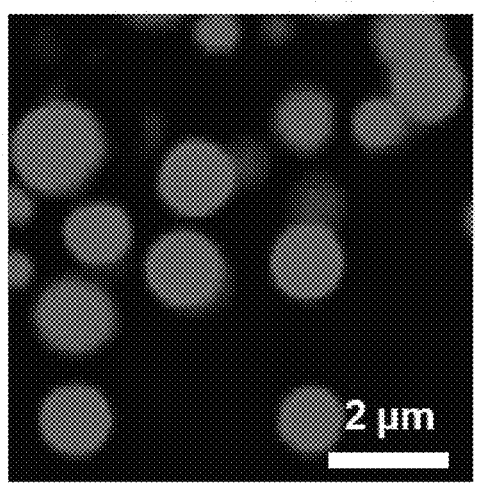
Figure 2C:
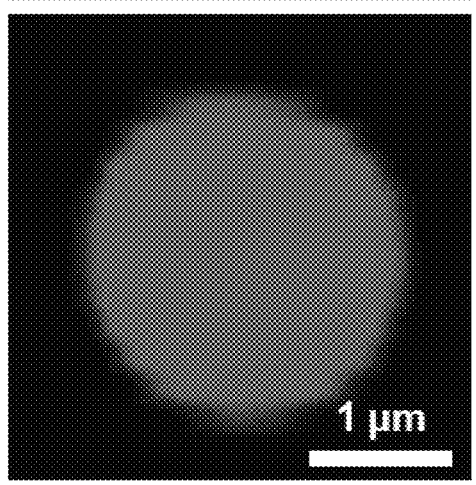

FIG. 1 illustrates a bearing including oil gel capsules. FIGS. 2A to 2C are confocal fluorescence images of oil gel capsule(s) included in a bearing. Referring to FIGS. 1 and 2, a bearing 10 may include a back steel 100, a bearing alloy 200, and an overlay layer 300, and the overlay layer 300 may include at least one or more oil gel capsules 310.

The oil gel capsule 310 is a particle including an oil gel 311 and a surfactant 312 surrounding the oil gel 311, and more specifically, is a particle including an oil gel 311 and at least one or more surfactants bonded to the oil gel 311. The oil gel 311 refers to an oil including a gelator 311B, and may include an oil 311A and the gelator 311B.

Figure 3:
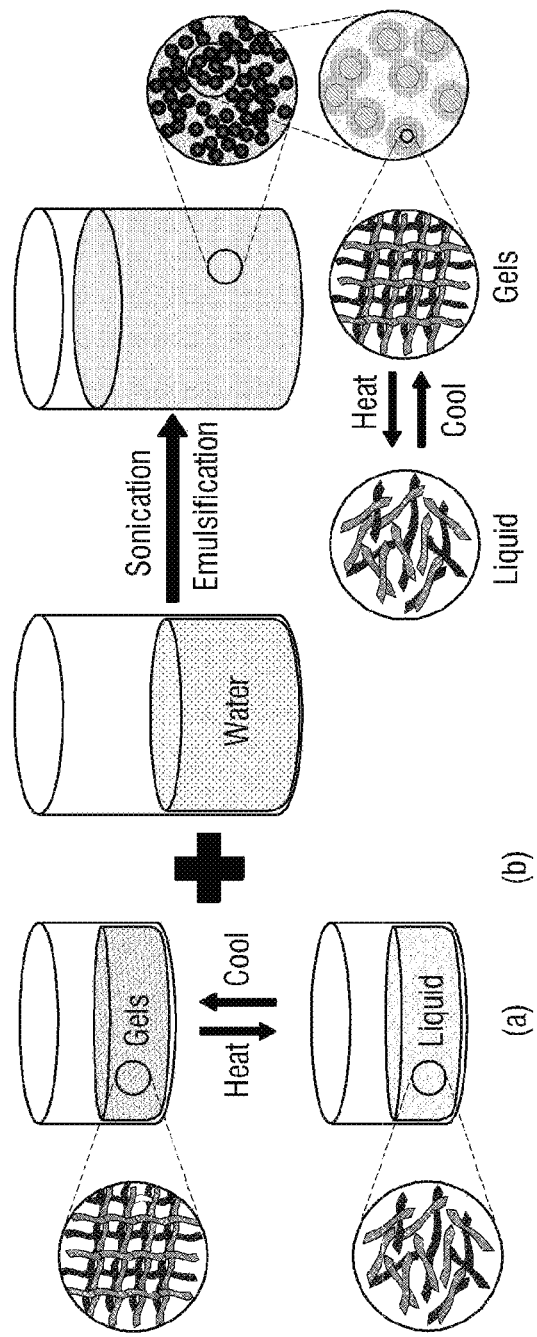
FIG. 3 illustrates a method for manufacturing oil gel capsules.

FIG. 3 illustrates a method for manufacturing oil gel capsules. Referring to FIG. 3, the method for manufacturing oil gel capsules may include (a) forming an oil gel by mixing an oil and a gelator and (b) producing at least one oil gel capsule by mixing the oil gel and an aqueous surfactant solution. Hereinafter, further referring to FIGS. 4 to 11, Steps (a) and (b) will be described in detail.

Step (a): oil gels may be formed by mixing an oil and a gelator. A gelator may be added to an oil. However, since the addition target and the addition direction do not need to be specified as described above, the oil may also be added to the gelator. The oil and the gelator may be mixed using an ultrasonic grinder for more uniform mixing. The formed oil gels may be in a gel state.

It is preferred that the weight ratio of the gelator when the oil and the gelator are mixed (the weight of the gelator based on the total weight of the oil) is a weight ratio that is effective for allowing the entire mixed oil to gel. Further, since the phase transition temperature of the oil gel varies depending on the weight ratio of the gelator, the weight ratio of the gelator is preferably a weight ratio that is effective for maintaining the oil gels in a gel state at room temperature, and is preferably a weight ratio that is effective for maintaining the gel state even in all the temperature environments (up to about 60° C.) that may be experienced before a bearing including the oil gels is mounted on a vehicle.

The phase transition temperature of an oil gel refers to a temperature at which the oil gel in a gel state is liquefied in a liquid state or the oil gel in a liquid state gels into the oil gel in a gel state. The oil gel may maintain a gel state at a temperature lower than the phase transition temperature, and may maintain a liquid state at a temperature higher than the phase transition temperature.

According to an exemplary embodiment of the present invention, the oil may be an engine oil, and the gelator may be 12-hydroxyoctadecanoic acid (hereinafter, 12-HSA). The weight ratio of 12-HSA is preferably 1 to 10% by weight based on the total weight of the engine oil, and the oil gels may have a phase transition temperature of about 60° C. or more and about 70° C. or less. When less than 1 wt % of 12-HSA is mixed with the engine oil, a network-like fibrous structure of 12-HSA may not be formed in the engine oil, and accordingly, the oil gels may not be formed. When more than 10 wt % of 12-HSA is mixed with the engine oil, the oil gels may reach a saturated state in which the amount of increase in the phase transition temperature of the oil gel due to the amount of increase in the weight ratio of 12-HSA is reduced, and the weight of the engine oil is relatively decreased as compared to the weight of the gelator, so that the lubrication characteristics of the oil gels or the oil gel capsules may deteriorate. Accordingly, it is preferred that 12-HSA is added in an amount of 1 to 10 wt % based on the total weight of the engine oil. However, the type of gelator and the weight ratio of gelator are not limited thereto.

Figure 4A:
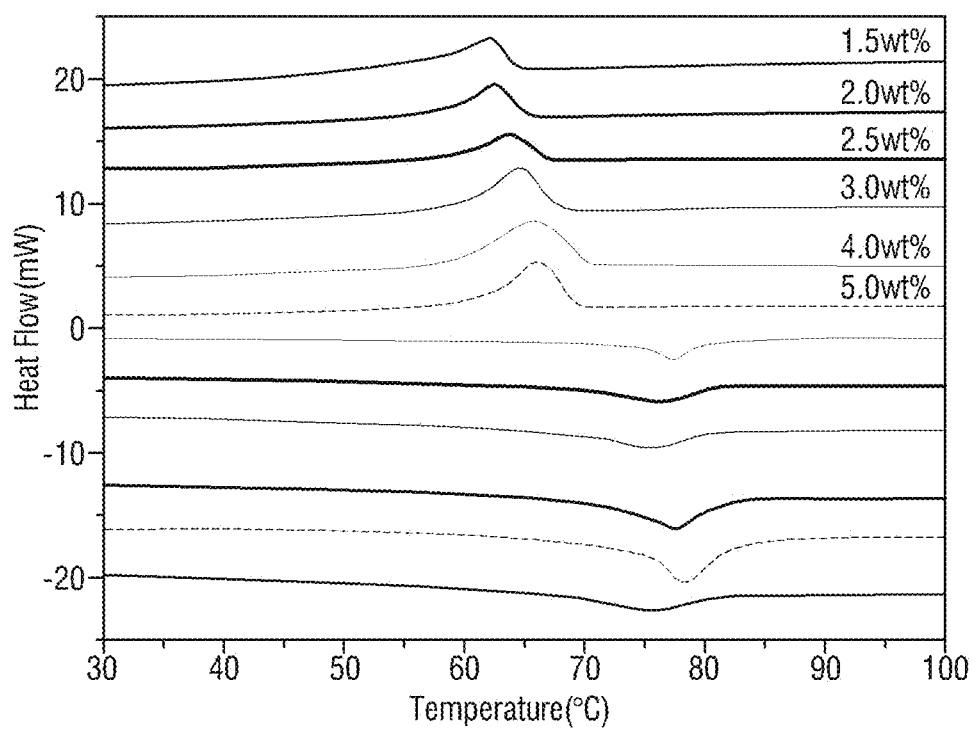
FIGS. 4A and 4B illustrate the results of measuring the phase transition temperature of the oil gels by DSC according to the weight ratio of 12-HSA.
Figure 4B:
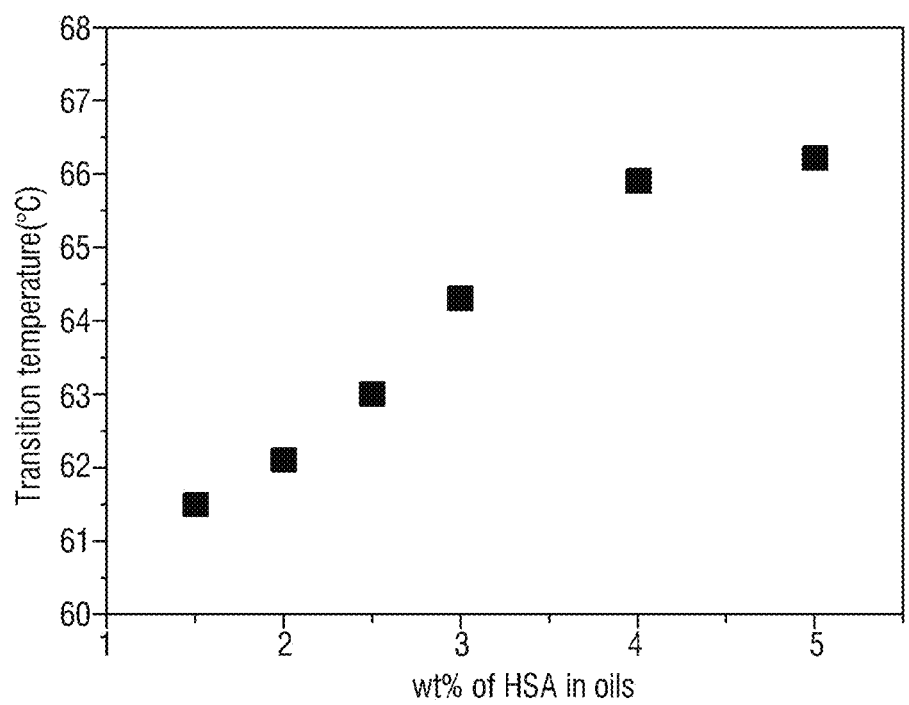

FIGS. 4A and 4B illustrate the results of measuring the phase transition temperature of the oil gels by DSC according to the weight ratio of 12-HSA. Referring to FIGS. 4A and 4B, it can be confirmed that when 1.5 wt % or more of 12-HSA is added, an oil gel having a phase transition temperature of more than about 61° C. may be formed.

Figure 5A:
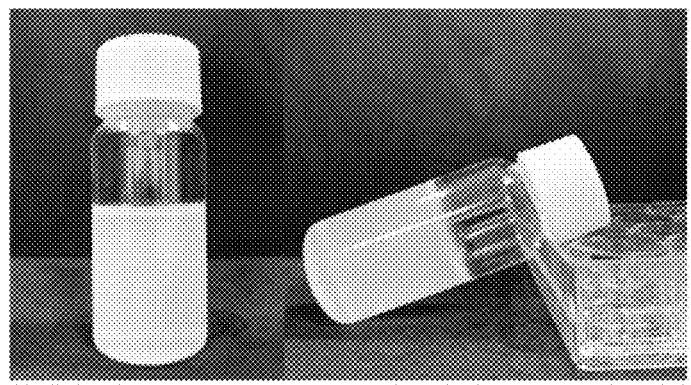
FIG. 5A and FIG. 5B, is a series of photographs taken at 25° C. after forming an oil gel having a phase transition temperature of about 62° C. by mixing an engine oil and 2 wt % of 12-HSA.
Figure 5B:
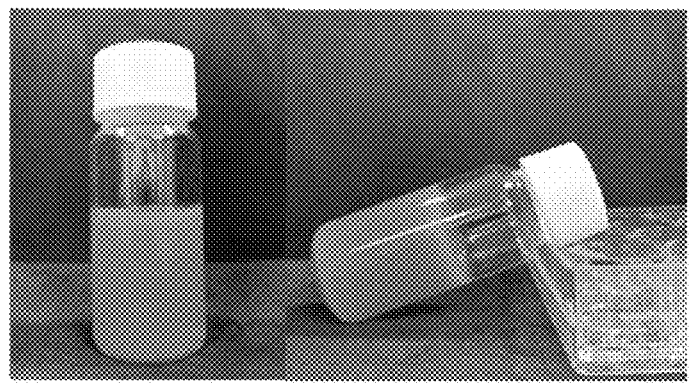

FIG. 5 is a series of photographs taken at 25° C. after forming an oil gel having a phase transition temperature of about 62° C. by mixing an engine oil and 2 wt % of 12-HSA. FIG. 5A is an oil gel to which a colorant is not added, and FIG. 5B is an oil gel to which a colorant is added. The colorant was added to more clearly exhibit the condition of the oil gels. Referring to FIGS. 5A and 5B, it can be seen that the oil gels are present in a gel state in which there is no fluidity at a temperature environment lower than the phase transition temperature of about 62° C. The absence of fluidity can be seen from the fact that the surface of the oil gel is not parallel to the ground plane. The gel state of the oil gel more specifically refers to a state in which the oil is formed and maintained while being confined in the network-like fibrous structure of the gelator.

Figure 6A:
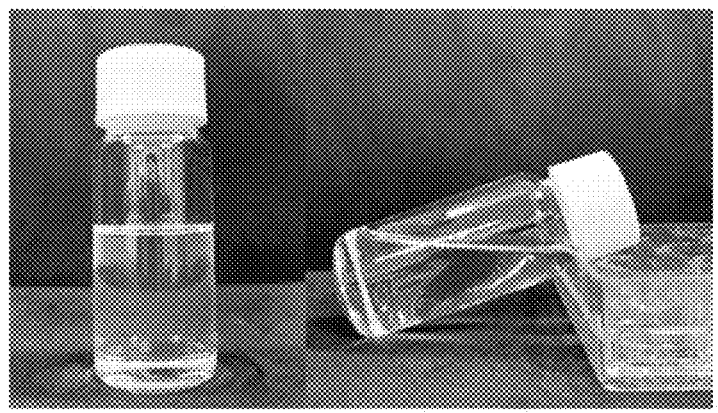
FIGS. 6A and 6B are photographs taken after heating the oil gels in FIGS. 5A and 5B to 90° C.
Figure 6B:
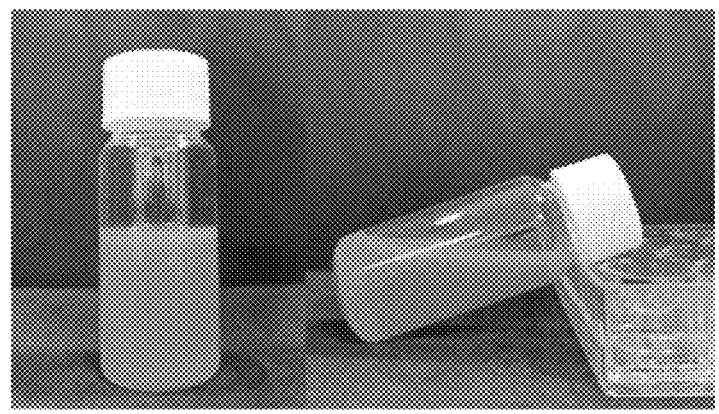

FIGS. 6A and 6B are photographs taken after heating the oil gels in FIGS. 5A and 5B to 90° C. Referring to FIGS. 6A and 6B, it can be seen that the oil gels recover fluidity and are present in a liquid state at a temperature environment higher than the phase transition temperature of about 62° C. The presence of fluidity can be seen from the fact that the surface of the oil gel is roughly parallel to the ground plane. The liquid state of the oil gels more specifically refers to a state in which the network-like fibrous structure of the gelator is disintegrated, and as a result, the gelator is present in a state of being dispersed in the oil.

It can be seen that when FIGS. 6A and 6B are compared to FIGS. 5A and 5B, the oil gels in a liquid state are more transparent than the oil gels in a gel state. When the oil gels in FIGS. 6A and 6B are cooled to 25° C., the oil gels may be recovered to the state of the oil gels in FIGS. 5A and 5B.

Step (b): at least one oil gel capsule may be produced by mixing the oil gels and an aqueous surfactant solution. The oil gel capsules may be produced while the oil gels in the aqueous surfactant solution are surrounded by each one of the surfactant molecules. On one hand, it can be seen that the oil gels are encapsulated by the surfactant. More specifically, since the oil gel is fat-soluble (hydrophobic) and the aqueous surfactant solution is hydrophilic, an interface may be formed between the surface of the oil gel and the aqueous solution, and the oil gel capsules are produced while the fat-soluble portion of the surfactant faces the oil gels and simultaneously, the hydrophilic portion of the surfactant faces the aqueous solution.

Preferably, the oil gel capsules may be produced by mixing the oil gels in a liquid state with the aqueous surfactant solution. The oil gels in a gel state may be liquefied in advance and mixed with the aqueous surfactant solution, and after the oil gels in a gel state are added to the aqueous surfactant solution or the aqueous surfactant solution is added to the oil gels in a gel state, the oil gels in a gel state may be liquefied using thermal energy emitted from an ultrasonic grinder while being mixed by the ultrasonic grinder. In either case, it is preferred to use an ultrasonic grinder for more uniform mixing.

Since the surfactant can make the oil gels fine, it is possible to produce fine oil gel capsules. As the oil gels are made to be fine, the oil gel capsules may be more uniformly dispersed in the overlay layer. The oil gel capsules may be formed with a size of smaller than 10 μm which is an average thickness of the overlay layer, and the size may be 0.1 μm or more and less than 10 μm. Preferably, the oil gel capsules may have a size of 1 μm to 5 μm, and more preferably 1 μm or less.

The surfactant may prevent aggregation of the finely divided oil gels when the aggregated oil gel capsules, which are defined as an oil powder as follows, are re-dispersed in an organic solvent.

According to an exemplary embodiment of the present invention, the surfactant may be polyvinyl alcohol (PVA), and 1 to 10 wt % of the aqueous PVA solution may be mixed with the oil gels. Here, 1 to 10 wt % refers to the ratio of the weight of PVA to the weight of the aqueous PVA solution. When less than 1 wt % of the aqueous PVA solution is mixed with the oil gels, an aggregation phenomenon of oil gel capsules occurs strongly when the aggregated oil gel capsules, which are defined as an oil powder as follows, are re-dispersed in an organic solvent, so that the aggregated oil gel capsules could not be re-dispersed. When more than 10 wt % of the aqueous PVA solution is mixed with the oil gels, the content of oil in the oil gel capsules is relatively decreased, so that lubrication characteristics of oil gels and oil gel capsules may deteriorate. Since the role of the surfactant is to make the oil gels finer, to uniformly disperse the oil gels in the overlay layer of the oil gel capsule, and to prevent aggregation of the oil gels, the type of surfactant and the content of the surfactant are not limited thereto, and the surfactant may be selected from an anionic surfactant, a cationic surfactant, an amphoteric surfactant, and a nonionic surfactant. Meanwhile, the weight ratio of the oil gels to the aqueous surfactant solution upon mixing of the oil gels and the aqueous surfactant solution may be 1:2 to 1:10.

Figure 7A:
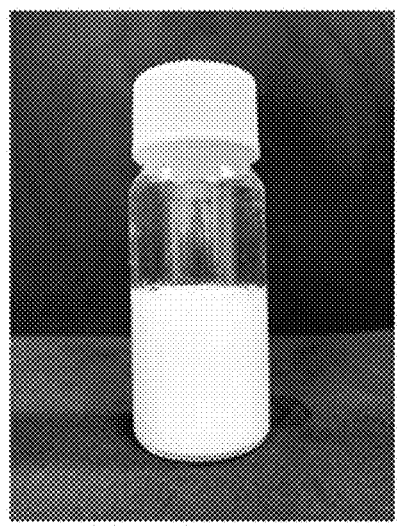
FIGS. 7A and 7B are photographs taken after adding and mixing a 2 wt % aqueous PVA solution to the oil gels in FIGS. 6A and 6B.
Figure 7B:
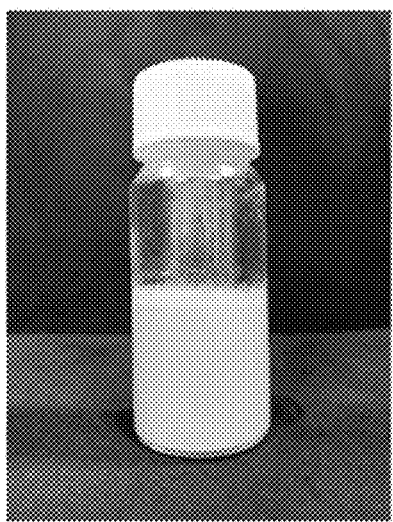

FIGS. 7A and 7B are photographs taken after adding and mixing a 2 wt % aqueous PVA solution to the oil gels in FIGS. 6A and 6B. Referring to FIGS. 7A and 7B, it can be confirmed that the oil gels that were transparent in a liquid state prior to mixing were changed to the white color like milk. This means that an emulsion of fine particles in an aqueous solution has been formed, and the fine particles refer to oil gel capsules.

Figure 8:
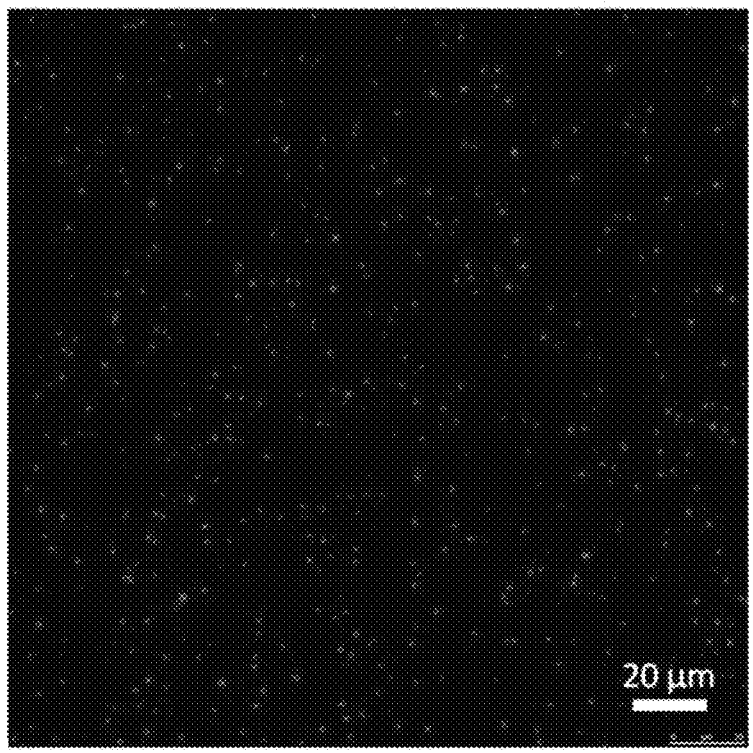
FIGS. 8 to 10 are confocal fluorescence images of oil gel capsules in the aqueous solution in FIG. 7B.
Figure 9:
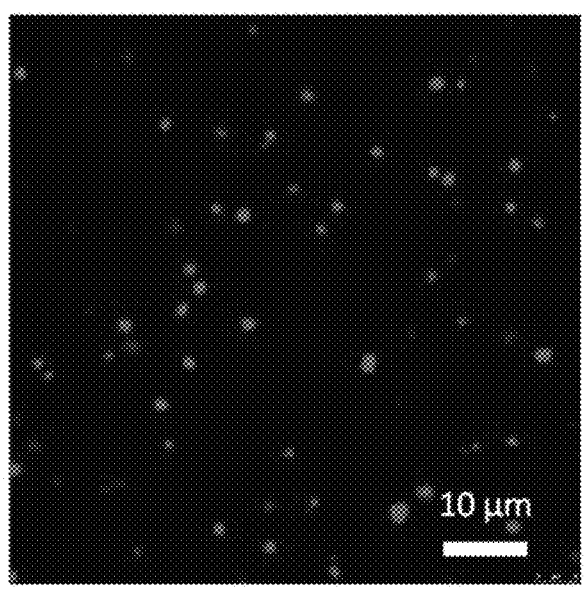
Figure 10:
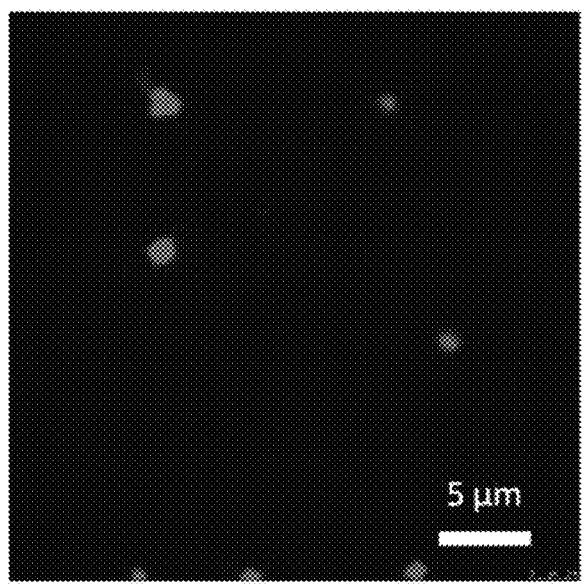
Figure 11:
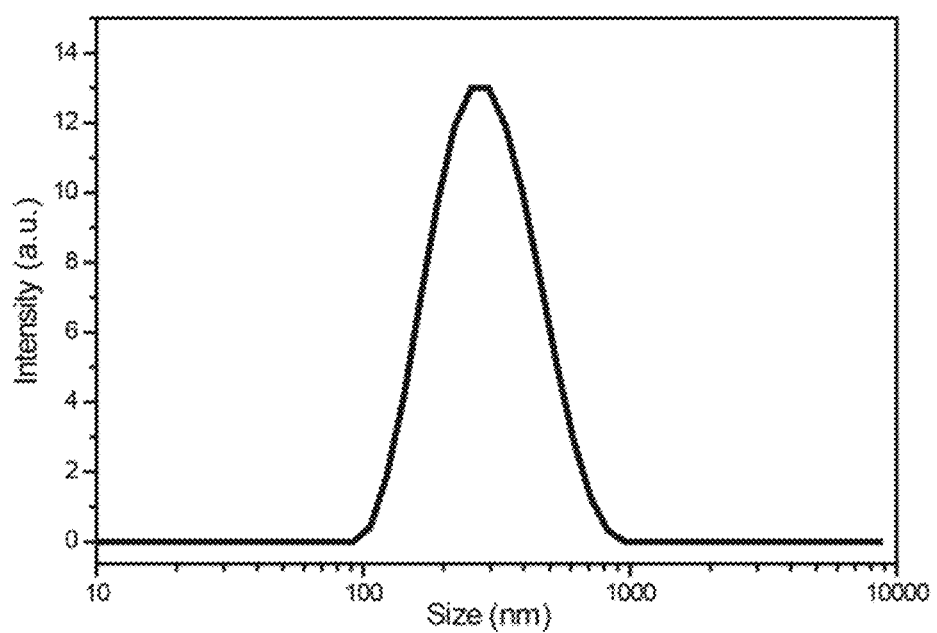
FIG. 11 illustrates a size distribution graph of oil gel capsules in the aqueous solution in FIG. 7A as measured by dynamic light scattering.

FIGS. 8 to 10 are confocal fluorescence images of oil gel capsules in the aqueous solution in FIG. 7B. FIG. 11 illustrates a size distribution graph of oil gel capsules in the aqueous solutions in FIG. 7A as measured by dynamic light scattering. Referring to FIGS. 8 to 11, it can be confirmed that the oil gel capsules may not have a spherical shape, and the size thereof is 1 μm or less. More specifically, the size of the oil gel capsules is 0.1 μm (=100 nm) and 1 μm (=1000 nm).

The method for manufacturing oil gel capsules may further include (c) drying an aqueous solution including at least one or more oil gel capsules. As the aqueous solution including oil gel capsules is dried, the distance between the oil gel capsules may be reduced, and the oil gel capsules may be agglomerated. The fact that the oil gel capsules are aggregated does not mean that at least two or more oil gel capsules are integrated into one oil gel capsule, but means that the surfactants of the respective oil gel capsules are in physical contact with each other. The aggregated oil gel capsules have a powdery shape while being viscous like clay, and may have a soft feel like powder. Hereinafter, the aggregation of at least two oil gel capsules refers to an oil powder. The oil powder may be added to an organic solvent, and the aggregated oil gel capsules may be dispersed again. The drying in Step (c) is preferably performed using a freeze dryer.

Figure 12A:
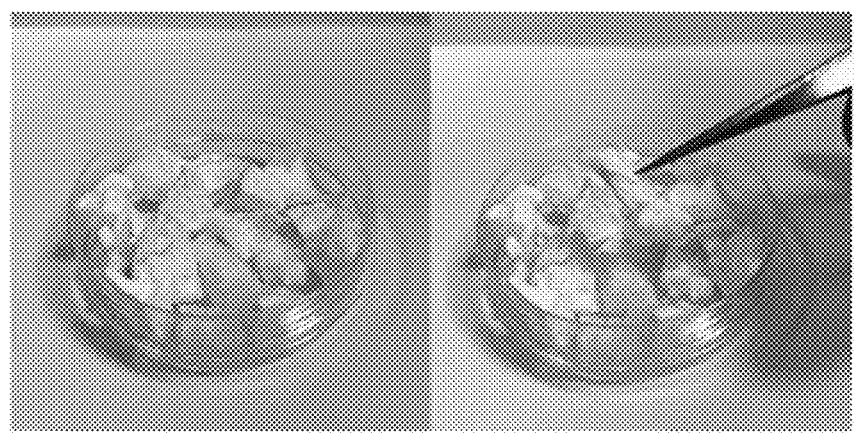
FIGS. 12A and 12B are photographs taken after freeze-drying the aqueous solution in FIGS. 7A and 7B.
Figure 12B:

FIGS. 12A and 12B are photographs taken after freeze-drying the aqueous solution in FIGS. 7A and 7B. Referring to FIGS. 12A and 12B, an oil powder may be confirmed, and it can be said that the oil gel capsules are recovered in a powder form. One powder on FIGS. 12A and 12B has a size that can be discerned by the unaided eye, but since the oil gel capsules produced through Step (b) have a micro unit or sub-micro unit size, it can be said that one powder is formed by agglomeration of a plurality of oil gel capsules.

Hereinafter, a process of adding oil gel capsules manufactured through Steps (a) to (c) to the overlay layer of the bearing will be described in detail. The steps described below may be referred to as Steps (d), (e), and (f).

In Step (d), aggregated oil gel capsules may be re-dispersed by adding an oil powder to an organic solvent. The aggregated oil gel capsules may be dispersed as illustrated in FIGS. 8 to 10. However, unlike FIGS. 8 to 10, both oil gels and the organic solvent, for example, N-methyl-2-pyrrolidone (NMP) are fat-soluble, so that an interface may not be formed on the surface of the oil gel, and a part of the surfactant bonded to the oil gel may be dispersed in an organic solvent. An organic solution including 2 to 10 wt % of an oil powder refers to a first organic solution, and it can be said that the first organic solution is an organic solution including 2 to 10 wt % of oil gel capsules. Here, wt % means the ratio of the weight of the oil gel capsules to the total weight of the first organic solution.

Figure 13A:
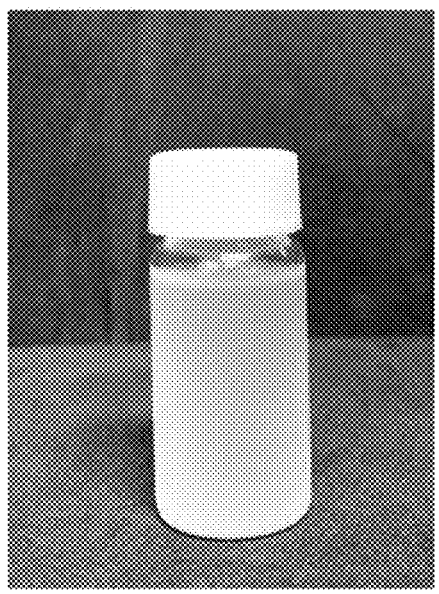
FIGS. 13A and 13B are photographs taken after preparing a first organic solution including 10 wt % of oil gel capsules by re-dispersing the oil powders in FIGS. 12A and 12B in NMP which is an organic solvent.
Figure 13B:
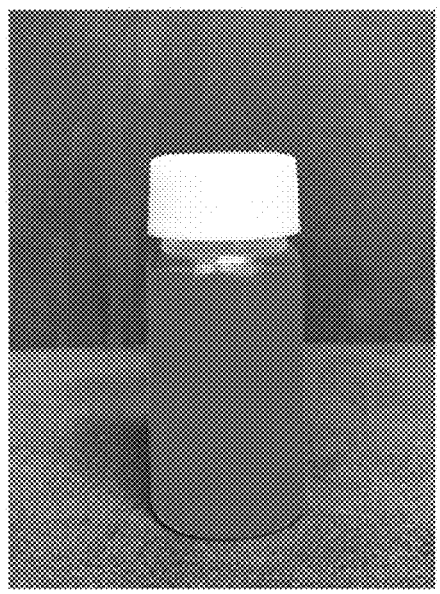

FIGS. 13A and 13B are photographs taken after preparing a first organic solution including 10 wt % of oil gel capsules by re-dispersing the oil powders in FIGS. 12A and 12B in NMP which is an organic solvent. Referring to FIGS. 13A and 13B, it can be seen through the semi-transparent color of the first organic solution that the aggregation of oil gel capsules has been eliminated.

Figure 14A:
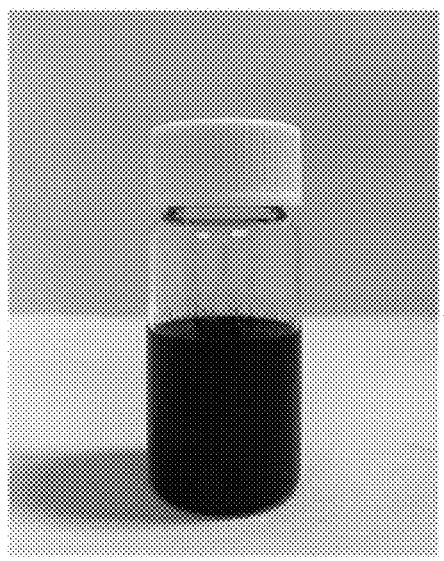
FIGS. 14A and 14B are photographs taken after mixing the first organic solutions in FIGS. 13A and 13B and a second organic solution including 50 wt % of polyamide-imide and an additive at a weight ratio of 1:1.
Figure 14B:
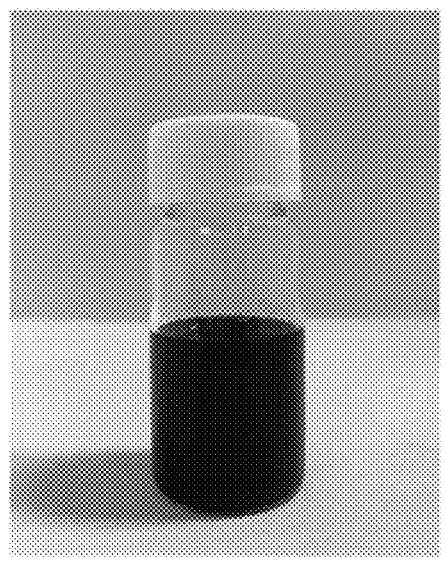

In Step (e), an overlay mixed solution may be prepared by mixing the first organic solution and a second organic solution including 30 to 50 wt % of polyamideimide and an additive at a weight ratio of 1:0.5 to 1:2. Here, wt % means the ratio of the weight of the solid content to the total weight of the second organic solution. The solvent of the second organic solution may be NMP. FIGS. 14A and 14B are photographs taken after mixing the first organic solutions in FIGS. 13A and 13B and a second organic solution including 50 wt % of polyamideimide and an additive at a weight ratio of 1:1.

Figure 15A:
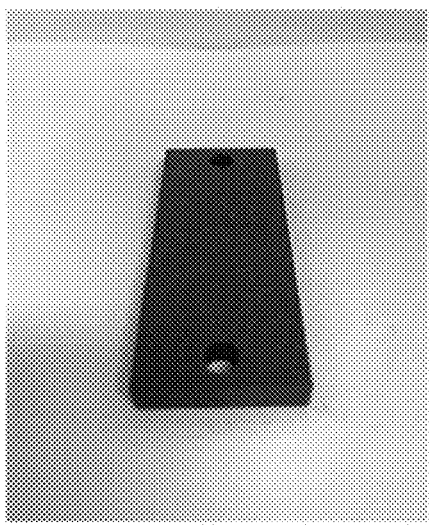
FIGS. 15A and 15B are photographs taken after coating the surface of a bearing alloy with the overlay mixed solutions in FIGS. 14A and 14B.
Figure 15B:

In Step (f), after a surface of a bearing alloy is coated with the overlay mixed solution, the bearing may be dried. FIGS. 15A and 15B are photographs taken after coating the surface of a bearing alloy with the overlay mixed solutions in FIGS. 14A and 14B. The bearing may be dried in one step, and may also be dried in two steps for preservation of the oil gel capsules. The completely dried bearing may have overlay layers having a thickness of 10 μm to 30 μm.

Hereinafter, the Examples and Comparative Examples of embodiments of the present invention will be described.

Process of Manufacturing Oil Gel Capsules

After 0.3030 g (about 2 wt %) of a gelator 12-HSA was added to 15 g of an engine oil, oil gels having a phase transition temperature of about 62° C. were manufactured by mixing the mixture using an ultrasonic grinder. 5 g of the oil gels were liquefied, 75 ml of a 2 wt % aqueous PVA solution was added thereto, and then oil gel capsules were manufactured by mixing the mixture using an ultrasonic grinder. An oil powder was recovered by removing water from the aqueous solution including oil gel capsules using a freeze dryer.

Process of Manufacturing Overlay Layer

Example 1

An NMP solution (a first organic solution) including 10 wt % of oil gel capsules was prepared by adding 10 g of an oil powder to 90 g of an NMP solvent. Upon the preparation of the first organic solution, the oil gel capsules were uniformly re-dispersed in the NMP solvent using a stirrer. After an NMP solution (a second organic solution) including 50 wt % of polyamideimide and an additive (including a lubricant) was prepared, an overlay mixed solution was prepared by mixing 50 g of the first organic solution and 50 g of the second organic solution. After the surface of a bearing alloy was coated with the overlay mixed solution and dried at 150° C. to 200° C. for 30 minutes, an overlay layer having a thickness of about 10 μm was manufactured by drying the surface of the bearing alloy at 210° C. to 240° C. for 15 minutes. (Example 1 is represented by Sample 1 in FIGS. 16 and 17.)

Example 2

A coating layer having a thickness of about 20 μm was manufactured by coating the surface of the bearing alloy with the overlay mixed solution in Example 1 two times. (Example 2 is represented by Sample 2 in FIGS. 16 and 17.)

Example 3

A coating layer having a thickness of about 30 μm was manufactured by coating the surface of the bearing alloy with the overlay mixed solution in Example 1 three times. (Example 3 is represented by Sample 3 in FIGS. 16 and 17.)

Comparative Example 1

An overlay layer of about 10 μm was manufactured using only the prototype DLA02. (Comparative Example 1 is represented by DLA02 in FIGS. 16 and 17.)

Figure 16:
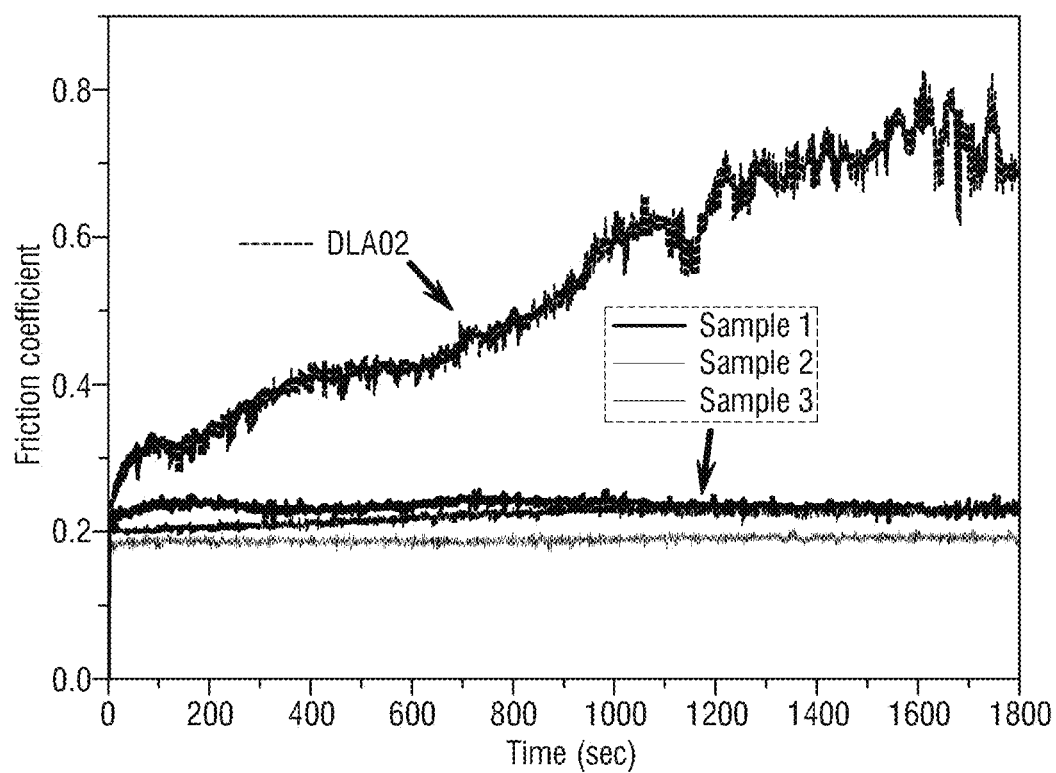
FIGS. 16 and 17 illustrate the results of Examples 1 to 3 and Comparative Example 1 for the steel disc sample reciprocating sliding friction test.
Figure 17:
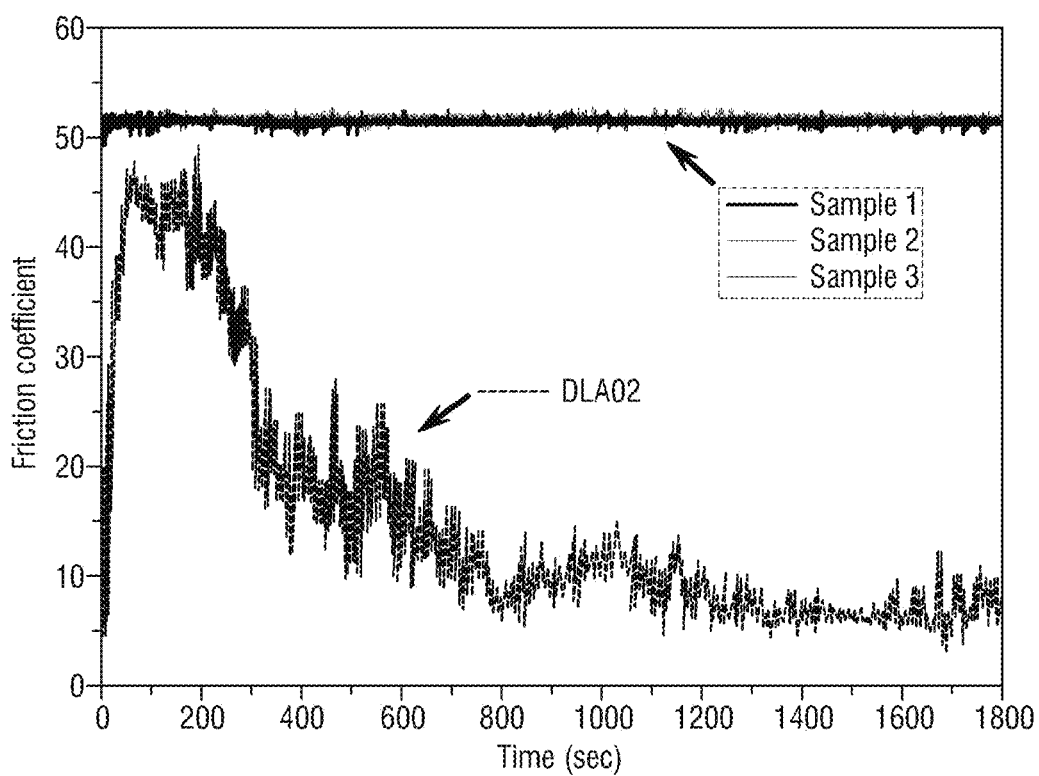

FIGS. 16 and 17 illustrate the results of Examples 1 to 3 and Comparative Example 1 for the steel disc sample reciprocating sliding friction test. The test conditions were a dry condition, 10 minutes, a load of 50 N, a reciprocating speed of 5 Hz, and a reciprocating distance of a 10 mm stroke. Referring to FIGS. 16 and 17, it can be seen that in the case of Comparative Example 1 in which oil gel capsules were not included, a continuous increase in friction and a decrease in contact voltage were observed through a repeated friction test, but in the case of Examples 1 to 3, the initial friction coefficient and contact voltage were maintained even after 10 minutes passed. That is, it can be confirmed that the oil gel capsules may improve low friction characteristics and seizure resistance characteristics of the bearing.

Figure 18:
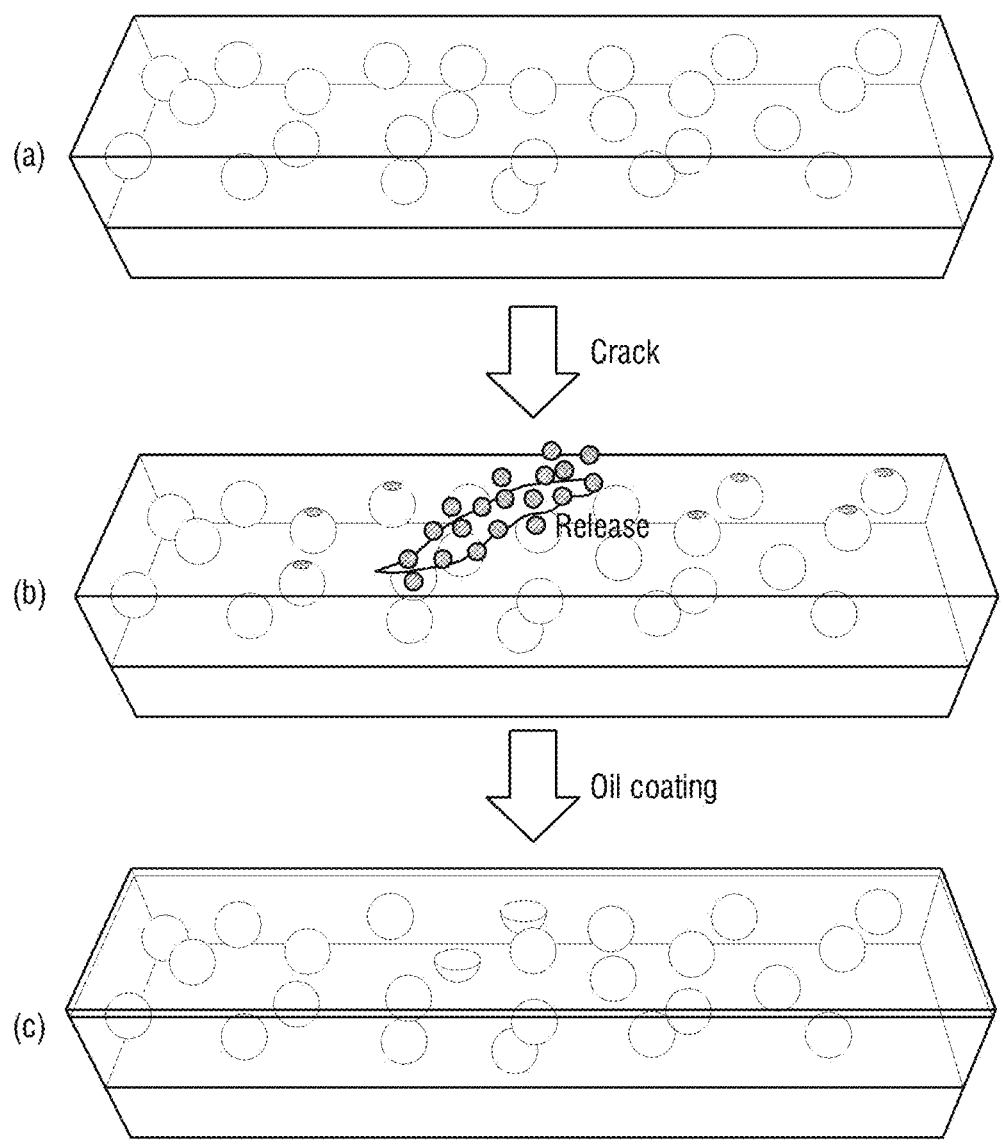
FIG. 18 illustrates the action process of the oil gel capsules.

FIG. 18 illustrates the action process of the oil gel capsules in steps (a)-(c). In the initial stage of vehicle operation, friction towards the bearing may cause wear and tear or cracks in the overlay layer and the bearing alloy together with a local increase in temperature. The local increase in temperature may convert oil gels in a gel state into oil gels in a liquid state, and the oil gels in a liquid state may form a lubricating film at a worn or cracked site. As a result, it is possible to suppress additional friction and wear and tear on the bearing at the wear step in the early stage of vehicle operation, and to extend the lifetime of the bearing. Further, a gelator may be diluted with an excessive amount of engine oil, and since the gelator does not form a network-like fibrous structure at low concentration, an aggregation phenomenon of the gelator may not occur even after an oil is released. A surfactant is also diluted with an engine oil, so that the aggregation phenomenon may not occur.

Oil gel capsules may be added to a lubricant, and may further improve lubrication characteristics of the lubricant. Furthermore, as the need for developing the next-generation eco-friendly vehicle, for example, high-efficiency engine is emerging, oil gel capsules may also be applied to an engine for a hybrid vehicle in which the engine friction and wear environment further deteriorates, an electric vehicle which is operated under a non-lubricant environment, and a hydrogen fuel cell vehicle.

The present invention has been described in detail through various embodiments and representative examples, but it is to be understood by a person with ordinary skill in the art to which the present invention pertains that various modifications are possible in the above-described embodiments and examples within the range not departing from the scope of the present invention. Therefore, the scope of the present invention should not be limited to the above-described embodiments and examples but should be determined by not only the claims to be described below but also all the changes or modified forms derived from the claims and the equivalent concept thereof.

What is claimed is:

1. An oil gel capsule comprising:
   an oil gel comprising an engine oil and a gelator; and
   a surfactant bonded to the oil gel;
   wherein the gelator is 12-hydroxyoctadecanoic acid;
   wherein a content of the 12-hydroxyoctadecanoic acid is 1 to 10 wt % based on a total weight of the engine oil;
   wherein the oil gel has a phase transition temperature of about 60° C. to about 70° C.; and
   wherein the oil gel capsule has a size of about 0.1 μm to 1 μm.

2. The oil gel capsule of claim 1, wherein the oil gel is in a gel state at a temperature less than the phase transition temperature.

3. The oil gel capsule of claim 1, wherein the oil gel is in a liquid state at a temperature greater than the phase transition temperature.

4. The oil gel capsule of claim 1, wherein the surfactant is polyvinyl alcohol (PVA).

5. An oil powder comprising a plurality of the oil gel capsules of claim 1, wherein the oil gel capsules are aggregated.

6. A contact part for a vehicle, the contact part comprising:
   an overlay layer formed on a surface of the contact part, the overlay layer comprising oil gel capsules, wherein the oil gel capsules comprise:
   an oil gel comprising an engine oil and a gelator; and
   at least one surfactant bonded to the oil gel;
   wherein the gelator is 12-hydroxyoctadecanoic acid;
   wherein a content of the 12-hydroxyoctadecanoic acid is 1 to 10 wt % based on a total weight of the engine oil;
   wherein the oil gel has a phase transition temperature of about 60° C. to about 70° C.;
   wherein the oil gel capsule has a size of about 0.1 μm to 1 μm; and
   wherein the overlay layer has a thickness of 10 μm to 30 μm.

7. The contact part of claim 6, wherein the overlay layer comprises an organic solution comprising the oil gel capsules.

8. The contact part of claim 7, wherein the overlay layer is configured to be coated on the surface of the contact part, and the contact part is configured to be dried after the overlay layer is coated thereon.

9. The contact part of claim 7, wherein the surfactant is polyvinyl alcohol (PVA).

10. A method for manufacturing a contact part for a vehicle, the method comprising:
    manufacturing oil gels by mixing an oil and a gelator;
    producing a plurality of oil gel capsules by mixing the oil gels and an aqueous surfactant solution to form an aqueous solution;
    recovering oil powder by drying the oil gel capsules and the aqueous solution;
    preparing a first organic solution comprising 2 to 10 wt % of the oil gel capsules by re-dispersing the oil powder in an organic solvent;
    preparing an overlay mixed solution by mixing the first organic solution and a second organic solution comprising 30 to 50 wt % of polyamideimide and an additive at a weight ratio of 1:0.5 to 1:2;
    coating a surface of the contact part with the overlay mixed solution; and
    drying the contact part to form an overlay layer from the overlay mixed solution;
    wherein the oil is an engine oil;
    wherein the gelator is 12-hydroxyoctadecanoic acid;
    wherein a content of the 12-hydroxyoctadecanoic acid is 1 to 10 wt % based on a total weight of the engine oil;
    wherein the oil gel has a phase transition temperature of about 60° C. to about 70° C.;
    wherein the oil gel capsule has a size of about 0.1 μm to 1 μm; and
    wherein the overlay layer has a thickness of 10 μm to 30 μm.

11. The method of claim 10, wherein the drying comprises freeze-drying.

12. The method of claim 10, wherein the aqueous surfactant solution is polyvinyl alcohol (PVA).

13. The oil gel capsule of claim 2, wherein the surfactant is polyvinyl alcohol (PVA).

14. The oil gel capsule of claim 3, wherein the surfactant is polyvinyl alcohol (PVA).

15. The contact part of claim 8, wherein the overlay layer comprises an organic solution comprising the oil gel capsules.

16. The contact part of claim 6, wherein the surfactant is polyvinyl alcohol (PVA).

17. The contact part of claim 8, wherein the surfactant is polyvinyl alcohol (PVA).

* * * * *